C. F. BJICK.
Treating Leaf-Tobacco.

No. 195,878.

2 Sheets—Sheet 1.

Patented Oct. 9, 1877.

Witnesses:
J. C. Wilcke
A. H. Sherburne

Inventor:
Carl F. Bjick
By Gridley & Sherburne
Attys.

C. F. BJICK.
Treating Leaf-Tobacco.

No. 195,878. Patented Oct. 9, 1877.

UNITED STATES PATENT OFFICE.

CARL F. BJICK, OF CHICAGO, ILLINOIS.

IMPROVEMENT IN TREATING LEAF-TOBACCO.

Specification forming part of Letters Patent No. 195,878, dated October 9, 1877; application filed February 13, 1877.

*To all whom it may concern:*

Be it known that I, CARL F. BJICK, of Chicago, in the county of Cook and State of Illinois, have invented new and useful Improvements in Machines for Steaming and Sprinkling Leaf-Tobacco; and I do hereby declare the following to be a full, clear, and exact description thereof, which will enable others skilled in the art to which it appertains to make and use the same, reference being had to the accompanying drawing, forming part of this specification, in which—

Figure 1:
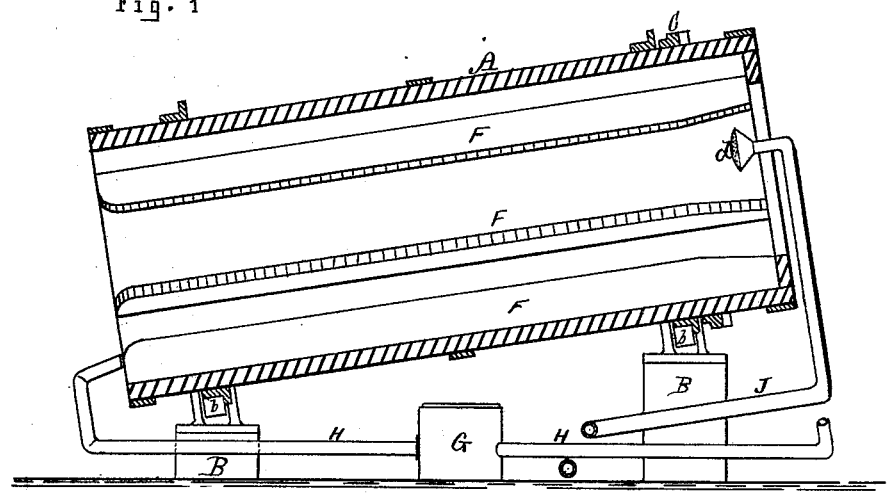
Figure 2:
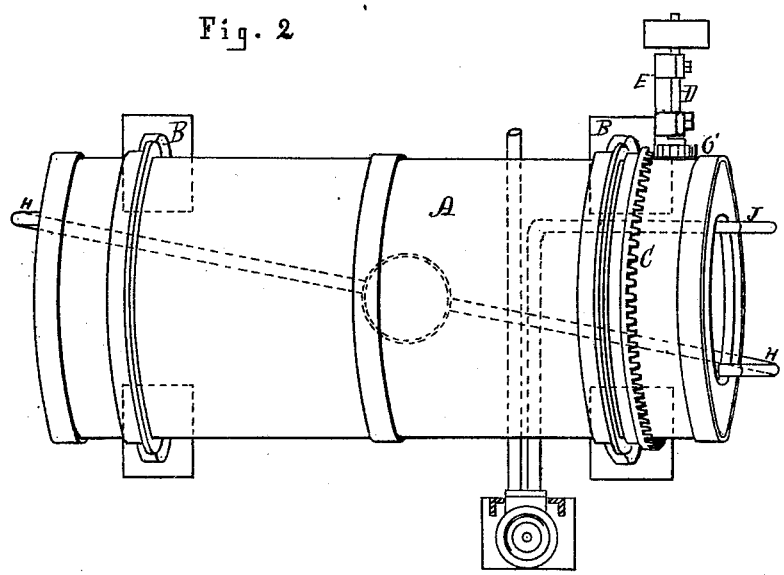
Figure 3:
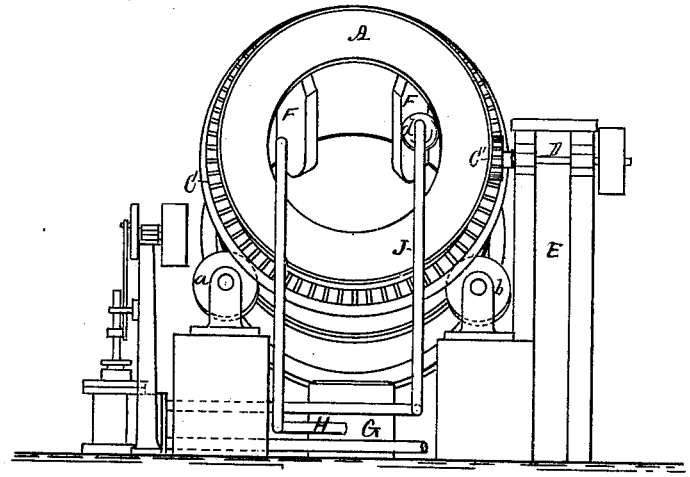
Figure 4:
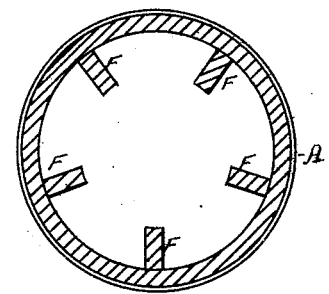

Figure 1 represents a longitudinal sectional elevation of a machine for steaming and sprinkling leaf-tobacco, embodying my invention. Fig. 2 represents a general plan or top view of the same. Fig. 3 represents an end elevation of the same, and Fig. 4 represents a cross-section of the steaming-cylinder detached.

Like letters of reference indicate like parts.

The object of my invention is to provide a machine for steaming and sprinkling tobacco-leaf for the purpose of moistening and sweetening the same, and so as to prevent the leaf-tobacco from crumbling or being broken during the process of stemming; and to that end my invention consists in the construction and arrangement of the several parts of the machine, as hereinafter described and claimed.

In the drawing, A represents a cylinder, made of wood and open at both ends, and which is mounted upon a series of anti-friction rollers, $a$ $b$, journaled to a suitable framework or the bed-timbers B, as shown in Figs. 1 and 3.

The said cylinder is preferably made about three feet in diameter and fifteen feet in length, and is arranged on an incline, as shown in Fig. 2, and into which the leaf-tobacco to be moistened and sweetened is fed or placed.

C is an annular gear-rim, mounted upon and around the cylinder A near its end, and is adjusted to engage with a gear-pinion, C', on a horizontal shaft, D, journaled to the framework E of the machine, by which means a rotary motion is imparted to the cylinder by the rotary motion of the shaft.

The cylinder A is provided on its inner periphery with a series of radial wings or shelves, F, arranged at a uniform distance each from the other, and extending the entire length of the cylinder, and which act to turn the leaf-tobacco and keep the same agitated when the cylinder is in motion.

G is a steam-reservoir, into which steam flows as it is generated in a boiler. (Not shown.)

H H are steam-pipes, each of which communicates at one end with the reservoir G, and at the opposite end with the interior of the cylinder, through the open ends thereof.

The said pipes may communicate at one end direct with the steam-boiler, if desired, the object of said pipes being to discharge the steam into the cylinder, and in contact with the leaf-tobacco contained therein.

J is an induction-pipe, communicating at one end with the interior of the cylinder A, through the open end thereof, and at the opposite end with any suitable force-pump having connection with a tank containing sirup for sweetening the leaf-tobacco.

Permanently secured upon the end of the pipe J, within the cylinder, is a sprinkling-nozzle, $d$, so as to cause the sirup to enter the cylinder in a series of small streams or in a spray as it is forced through the pipe by the action of the pump.

In using my said machine, the leaf-tobacco is fed into the cylinder, as the same is being rotated, by means of any suitable motor, when the sirup and steam are let into said cylinder and forced upon the leaf-tobacco as it is being agitated, thereby properly moistening and sweetening the same, so that when it leaves or is removed from the cylinder it is sufficiently moist for stemming.

I am aware that steam and sweetening have been applied to tobacco in a revolving cylinder, the sweetening material and steam being carried through one and the same nozzle to the tobacco; but such I do not claim, as my apparatus applies the steam at one end of the apparatus, and the sweetening material at the other end.

Having thus described my invention, what I claim as new, and desire to secure by Letters Patent, is—

The inclined rotating cylinder A, provided with wings F, in combination with the pipes J and H, entering the cylinder at opposite ends, for conducting steam and sweetening material to the tobacco, substantially as specified.

CARL F. BJICK.

Witnesses:
C. W. BJICK,
N. C. GRIDLEY.